United States Patent [19]

Uphoff

[11] 4,238,382

[45] Dec. 9, 1980

[54] COMPOSITION AND PROCESS FOR DELUSTERING PLASTISOL FILMS

[75] Inventor: John W. Uphoff, Kankakee, Ill.

[73] Assignee: Brunswick Corporation, Skokie, Ill.

[21] Appl. No.: 25,071

[22] Filed: Mar. 29, 1979

[51] Int. Cl.³ .......................... C08K 5/05; C08K 5/01; C08K 5/02

[52] U.S. Cl. .................. 260/33.4 SB; 260/33.4 R; 260/33.4 F; 260/33.6 R; 260/33.6 F; 260/33.8 R; 260/33.8 F

[58] Field of Search ............... 260/33.6 SB, 33.6 R, 260/33.4 F, 33.4 SB, 33.4 R, 33.8 UA, 33.8 F; 428/427, 245, 290

[56] References Cited

U.S. PATENT DOCUMENTS 4,024,100  5/1977  Kuhn et al. .................. 260/33.4 SB Primary Examiner—Lewis T. Jacobs
Attorney, Agent, or Firm—John L. Isaac; William G. Lawler

[57] ABSTRACT

A composition for application to a carrier cloth to enable ready release of a plastisol film formed on the carrier cloth and for delustering the release surface of the film and process for manufacturing a plastisol film using such composition. The composition comprises a mixture of a silicone polyester resin, a fluorotelemer for delustering the release surface and permitting ready release of the film from the cloth, a curing agent for the resin, a catalyst solution to initiate reaction between the resin and the curing agent upon application of appropriate heat, an inert flatting agent for reducing the gloss of the plastisol release surface, an anti-settling agent having a thixotrop in solution to prevent settling of the flatting agent prior to curing of the resin and to prevent foaming of the composition when applied to the carrier cloth, and an aromatic solvent to maintain the mixture in solution prior to application of the heat and to permit ready application of the composition to the cloth. A process for treating a carrier cloth with such a composition and for producing plastisol films therewith is also disclosed.

19 Claims, No Drawings

COMPOSITION AND PROCESS FOR DELUSTERING PLASTISOL FILMS

BACKGROUND OF THE INVENTION

1. Field of the Invention

This invention relates to the formation of plastisol films and more particularly to compositions useful in the formation of such plastisol films. More specifically, the invention relates to a composition for application to a carrier cloth upon which plastisol films are formed for the purpose of delustering the surface of the formed plastisol film and for effecting ready release of the formed plastisol film from the coated carrier.

2. Description of the Prior Art

Plastisol resin compositions are well known in the art and generally comprise dispersions of thermoplastic resins in the form of fine particles, the dispersion medium being a plasticizer for the resin. Such dispersions have appreciable fluidity in normal temperatures but are generally converted by heat into a flexible, tough thermoplastic member by the process of fusion wherein the resin becomes plasticized and solvated by the plasticizer. Such plastisol resin materials have been useful in the formation of numerous different products such as upholstery, fabric coverings, coverings for various objects and for camouflage. Such plastisol resin coatings are frequently formed by laying down a layer of the liquid plasticizer on the fabric to be coated and then subjecting the coated fabric to an elevated temperature to cure and plasticize the resin to form the hard plastisol layer. Examples of such formation processes and the uses for such plastisols are disclosed in U.S. Pat. No. 2,566,982 and U.S. Pat. No. 3,076,234.

As previously mentioned, plastisol films are also useful in the construction of camouflage materials. In the formation of such plastisol films, the liquid plastisol is laid down on a continuous carrier cloth material, cured, and then separated from the carrier material. This separated plastisol film is then combined with another layer of plastisol film and a backing substrate material to form camouflage materials. Thus, in the formation of camouflage, the plastisol film does not remain secured to the carrier cloth upon which it is formed. One example of such a formation process of plastisol film for camouflage is illustrated in U.S. patent application Ser. No. 920,958, filed June 30, 1978, by Kenneth Morton, and assigned to the assignee of the present application.

There are several problems particular to the formation of plastisol films for camouflage purposes where the plastisol film must be separated from the carrier cloth. One such problem is that under normal circumstances, the cured plastisol film has a highly lusterous finish. However, camouflage requirements necessitate that the surface of the camouflage material to be viewed must be dull and matte. Thus, when the plastisol film is separated from the carrier cloth, the surface of the plastisol film which abutted the carrier cloth must in some manner be formed with a dull, matte finish. In other words, the surface must be delustered (the normal luster of the plastisol must be removed).

A second problem with the above is that the plastisol film must be readily and easily separated from the carrier cloth after its formation so that it does not adhere to the cloth. Otherwise, pieces of the plastisol film may be removed from the film and retained on the carrier, and the plastisol film may even tend to tear during separation.

Heretofore, the above-described problems were overcome only with considerable expense and difficulty. For example, to achieve proper delustering of the plastisol film surface and to insure easy separation of the plastisol film from the carrier cloth, the carrier cloth was in one instance coated on both sides with two layers of a non-drying coconut oil alkyd containing colloidal silica. In addition, the side of the cloth to be used for formation of the plastisol film was given a top coat of a silicone resin. After the formation of each coating on one surface of the carrier cloth, this coating was then subjected to heat to cure the resin material. Thus, to properly treat the carrier cloth, five separate coating and curing cycles were required. The silicone top coat acted as a release agent for the fused vinyl plastisol film to permit ready release of the film from the carrier cloth after the formation of the film.

The difficulties with the previously described solutions to the aforementioned problems are several. First, considerable time and expense is required to separately apply and cure five different coatings on a long continuous roll of carrier cloth. Second, in order to insure that each coating will adhere to the prior applied coating, the chemical composition and coating quantity parameters have to be closely controlled. Otherwise, a subsequent coating would not completely adhere to a prior applied coating on the carrier cloth. Third, in order to obtain the proper delustering of the plastisol film bottom surface, careful comparison tests have to be run for each color of plastisol film to be formed on a particular cloth having the five coated layers thereon. Such tests are time consuming and expensive. However, if they are not performed, proper delustering of the plastisol film can not be insured. Therefore, each time the color of the plastisol film to be formed was to be changed, such comparison tests were required. Fourth, since the rolls of carrier cloth are quite long and expensive, it is highly desirable to be able to reuse a roll of carrier cloth upward to one hundred times or more. Thus, the coatings applied to the cloth to achieve proper delustering and release of the plastisol film must function properly throughout the life of the carrier cloth. In order to achieve such repeated usage, considerable time and effort must be expended when applying the various coatings to the carrier cloth to insure proper binding between the coatings as well as proper amounts. One example of such a problem is that if too much of the alkyd coating to the first surface of the cloth is applied so that the resin penetrates entirely through the cloth, the alkyd layer applied to the opposite side of the cloth will not properly adhere thereto. Furthermore, even if considerable time and quality control are utilized when applying the coatings to the carrier cloth, frequently the carrier cloths will not properly release the plastisol film after only a relatively few uses. Therefore, such a cloth would have to either be prematurely discarded or recoated with the silicone resin overcoat.

The present invention readily overcomes the problem of insuring proper delustering of the plastisol film surface and insuring ready release of the plastisol film from the carrier cloth while permitting the carrier cloth to be reused in excess of one hundred times without further treatment of the cloth. The present invention overcomes these problems while simultaneously obviates the previously described deficiencies and difficulties of the prior carrier cloth coating technique.

SUMMARY OF THE INVENTION

Therefore, it is one object of the present invention to provide a novel composition for application to a carrier cloth which permits ready release of a plastisol film formed on the carrier cloth while simultaneously delustering the release surface of the plastisol film.

It is another object of the present invention to provide a novel delustering composition for application to a carrier cloth for the formation of plastisol films wherein the composition retains its properties for delustering the plastisol film and permitting ready release of the plastisol film from the carrier cloth throughout a plurality of repeated uses of the carrier cloth.

A further object of the present invention is to provide a novel composition as described above which is easily applied to the carrier cloth.

Still another object of the present invention is to provide a novel process for treating a carrier cloth for use in the production of plastisol film having a delustered surface.

Another object of the present invention is to provide a novel process of manufacturing a plastisol resin film having a delustered surface.

In accordance with the invention, a composition for application to a carrier cloth which permits ready release of a plastisol film formed thereon and delusters the release surface of the film includes a silicone polyester resin and an effective amount of a fluorotelemer for delustering the release surface and permitting ready release of the plastisol film from the cloth. A curing agent is provided for reacting with and curing the resin upon application of an effective amount of heat to the composition, and an effective amount of a catalyst solution is also included to initiate the reaction between the resin and the curing agent upon application of the heat. The composition further includes an effective amount of an inert flatting agent for the purpose of reducing the gloss of the plastisol film release surface and an effective amount of an anti-settling agent having a thixotrop in solution to prevent settling of the flatting agent prior to curing of the resin as well as to prevent foaming of the composition when applied to the carrier cloth. The above mixture is dispersed in an effective amount of an aromatic solvent to maintain the mixture in solution prior to application of the heat and to permit ready application of the composition to the carrier cloth.

In a preferred embodiment of the present invention, the composition includes about 25-60% by weight of the silicone polyester resin and about 1-20% by weight of the fluorotelemer dispersed in a solvent. The fluorotelemer is preferably a telemer of the group consisting of tetrafluoroethylene and polytetrafluoroethylene.

The above composition may be used in a novel process of treating a carrier cloth for use in the production of plastisol film having a delustered surface. In accordance with the invention, the novel process includes first removing the sizing from the carrier cloth and adjusting the pH of the cloth to about 6.0-7.5 in order to insure the total removal of alkali components from the interstices of the cloth. Then, the above composition is prepared by first preparing a mixture of the silicone polyester resin, an effective amount of the fluorotelemer dispersed in a solvent, an effective amount of the inert flatting agent, an effective amount of the anti-settling agent and an aromatic solvent. This mixture is then blended throughly in order to disperse the particulate solids therein so as to maintain the sizes of such solids at a size no greater than about 25 microns. To this blended mixture is then added the curing agent, an effective amount of the catalyst solution and an additional amount of aromatic solvent to maintain the delustering agent in solution and to permit ready application of the composition to the carrier cloth. Once the delustering composition has been prepared, the surfaces of the carrier cloth are throughly coated with the delustering composition solution so as to fill the interstices therein. After such coating of the surfaces of the cloth, the coated carrier cloth is then dried at an elevated temperature sufficient to cure the resin of the composition.

A novel process of manufacturing a plastisol resin film having a delustered surface is also disclosed. In accordance with the invention, a film-forming plastisol agent is applied to one surface of the treated carrier cloth as described above. The plastisol agent disposed on the carrier cloth is then cured to form a solid film thereon. The plastisol film so formed is then separated from the carrier cloth with the carrier cloth being reusable thereafter for further formation of plastisol resin films without additional coating or treatment. In a preferred form of the invention, the plastisol film is separated from the carrier cloth by physically pulling the two layers apart, the plastisol film readily releasing from the carrier cloth due to the presence of the fluorotelemer in the delustering composition at the interface between the carrier cloth and the plastisol film.

DETAILED DESCRIPTION OF THE PREFERRED EMBODIMENTS

As described heretofore, the formation of plastisol films for the production of camouflage is well known in the art. Generally, two such plastisol films are formed and then laminated to a substrate to form the camouflage material, one side of each plastisol film being exposed to view on the final product. Thus, it is imperative that the one viewed surface of each plastisol film have a dull, matte finish, and that the normal luster of the plastisol be removed therefrom.

In prior art techniques for forming such camouflage plastisol films, such as described in the aforementioned U.S. patent application Ser. No. 920,958, assigned to the assignee of the present invention and the contents of which are specifically incorporated herein, a continuous carrier cloth is provided upon which a liquid plastisol agent is deposited. This carrier cloth with a layer of liquid plastisol agent is then baked so as to cure the plastisol resin and form the solid film. After the film formation, the plastisol film is separated from the carrier cloth and is used to form the camouflage material, while the carrier cloth is rewound and then reused in the process for forming plastisol films. The carrier cloth is initially treated so that the surface of the plastisol film immediately adjacent the cloth is delustered to form the required dull, matte finish. Furthermore, the carrier cloth has heretofore been treated to permit ready release of the plastisol film from the cloth and reuse of the carrier cloth. However, there have been significant problems in the prior art treatment of the carrier cloth as described in greater detail above.

The present invention is directed to a composition for treating the carrier cloth wherein such treatment is simple and economical, the resultant plastisol film surface is adequately delustered, and the carrier cloth is reusable numerous times. The composition of the present invention includes a mixture of a silicone resin and an effective amount of a fluorotelemer for delustering the release surface of the plastisol film and permitting ready release of the film from the carrier cloth. The mixture further includes a curing agent for curing the resin upon application of an effective amount of heat to cure the delustering composition, and an effective amount of a catalyst solution to initiate reaction between the resin and the curing agent upon application of the heat. To reduce the gloss of the plastisol release surface, an effective amount of an inert flatting agent is included in the composition, and an effective amount of an anti-settling agent including a thixotrop in solution is also included to prevent settling of the flatting agent prior to curing of the resin and to prevent foaming of the delustering composition when applied to the carrier cloth. This mixture is maintained in solution prior to application of the heat in an effective amount of an aromatic solvent to permit ready application of the delustering composition to the carrier cloth.

In the preferred embodiment of the present invention, the silicone polyester resin comprises a silicone-modified, oil free polyester resin which makes up the major component of the delustering composition. In preferred form, approximately 25–60% by weight, and more preferably approximately 50% by weight, of the composition comprises a silicone polyester resin. While the preferred resin consists of Aroplaz 1710, a trade name resin available from Ashland Chemical Company, any suitable type of silicone-modified, oil free polyester resin having a high heat resistance and capable of withstanding multiple bake sequences at temperatures of approximately 180° C. may be utilized. The Aroplaz 1710, however, exhibited the best flexibility, cure response, color retention and hardness when subjected to a multiple bake sequence, which bake sequence is present not only in the treatment of the carrier cloth but in use of the carrier cloth during multiple formations of plastisol films.

The most successful prior art carrier cloth treatment composition comprised a non-drying coconut oil alkyd base having a top coat of silicone resin. Thus, in the prior art system, the alkyd resin impregnated the carrier cloth interstices while the silicone resin acted as a release agent for the formed plastisol film. In the present invention, however, the silicone polyester resin acts as a base material for impregnating the carrier cloth interstices, and a fluorotelemer is admixed with the silicone resin and functions as the release agent. However, as described in more detail below, the fluorotelemer is not added as an overcoat as with the prior art silicone resin layers, but rather is intimately admixed with the silicone resin.

The fluorotelemer of the present invention is preferably a telemer of either tetrafluoroethylene or polytetrafluoroethylene in solution. In preferred form, the fluorotelemer of the present invention is a white, waxy short-chain telemer of tetrafluoroethylene in a trichlorotrifluoroethane solvent. Such fluorotelemers provide low coefficient of friction as well as excellent release of anti-stick properties. Furthermore, it appears from tests described in detail below that upon curing of the silicone polyester resin, such fluorotelemers intimately admixed therewith migrate toward the surface of the treated carrier cloth so as to provide a release agent at the surface thereof which is in some manner not yet known bound to the silicone resin so as not to wear after repeated uses. In the preferred embodiment, Vydax AR fluorotelemer dispersion, a trade name material available from DuPont Chemical Company, functions with best results. However, other polytetrafluoroethylenes may be utilized. Furthermore, while the preferred solvent for the telemer is trichlorotrifluoroethane, other solvents which adequately disperse the fluorotelemer include trichloroethane, methylene chloride, a 50/50 mixture of trichlorotrifluoroethane and toluene, a 50/50 mixture of trichlorotrifluoroethane and n-heptane, perchloroethylene, trichloroethylene, toluene, benzine and naphtha. It has been found that a 20 weight percent tetrafluoroethylene solution dispersed in trichlorotrifluoroethane is the preferred fluorotelemer which provides optimum release and delustering characteristics. In the preferred form, approximately 1–20 percent by weight of the fluorotelemer is used in the delustering composition, although approximately 4 percent by weight of the Vydax AR fluorotelemer is preferred.

The composition of the invention also includes an effective amount of a curing agent for curing the silicone resin upon application of an effective amount of heat to the composition after the composition is applied to the carrier cloth. The curing agent may comprise any appropriate curing compound which will react chemically with the selected silicone polyester resin and build crosslink density. Preferably, the curing agent comprises a methylated or butylated melamine or a methylated or butylated urea formaldehyde resin, the preferred curing agent being methyl melamine solution available under the trade name Resimene 735 from Monsanto Company. The amount of curing agent utilized in the delustering composition of the present invention is dependent upon the selected agent as well as the amount of silicone polyester resin present in the composition. However, approximately 5–30 percent by weight of the curing agent relative to the amount of silicone polyester is used in the delustering composition of the present invention, which amount is equivalent to approximately 1–18 percent by weight of the composition itself. In preferred form, approximately 9 percent by weight of the delustering composition consists of the curing agent while approximately 50 percent by weight of the composition comprises the silicone polyester.

The delustering composition of the present invention must also include an amount of a catalyst solution effective to initiate reaction between the resin and the curing agent upon application of an appropriate amount of heat. Any appropriate catalyst solution may be selected which functions to initiate polymerization of the curing agent with the silicone polyester without producing other deleterious effects on the composition or the carrier cloth. Preferably, approximately 2–4 weight percent of an organic acid in solution is utilized. In the preferred form, approximately 2 weight percent of cyclamic acid solution is utilized, the cyclamic acid solution comprising 10 weight percent of cyclamic acid particulate and 90 weight percent of an ethylene glycol methyl ether solvent.

The delustering composition of the present invention further includes an effective amount of an inert flatting agent for reducing the gloss of the plastisol film release surface and an effective amount of an anti-settling agent having a thixotrop in solution to prevent settling of the flatting agent prior to curing of the resin and to prevent foaming of the composition when applied to the carrier cloth. The inert flatting agent is preferably a very fine non-treated silicon dioxide. The silicon dioxide is present in an amount effective to reduce the gloss of the plastisol and help to achieve the matte finish of the plastisol film desirable to produce glare free camouflage. While many non-treated silicas may be readily usable in the present composition, the preferred silica is available under the trade name Syloid 244, a trademark material available from Davidson Chemical Division of the W. R. Grace and Company. Preferably, approximately 7–15 weight percent of this silica is used in the present composition to help achieve the flat finish of the plastisol release surface. In preferred form, approximately 10 weight percent of the Syloid 244 is utilized.

To prevent the silica or other flatting agent from settling in the composition prior to curing of the resin after application on the carrier cloth, an effective amount of anti-settling agent is included in the present composition. The anti-settling agent preferably comprises a thixotrop in solution. The anti-settling agent also functions to prevent foaming of the delustering composition when it is applied to the carrier cloth. While any known anti-settling agent may be utilized which functions to provide the appropriate anti-settling function and appropriate rheological controls upon application, it is preferred that a thixotropic clay in solution be utilized. More specifically, it is preferred that an organic modified Montmorillonite clay which comprises a tetraalkyl ammonium smectite be utilized. In the preferred embodiment, the thixotropic clay utilized is Bentone 38, a trade name product available from NL Industries, Inc. The Bentone 38 is preferably present in approximately 9–20 percent by weight in a solution of keytone and aliphatic petroleum naphthas. In the preferred form, approximately 9 percent of the Bentone 38 is utilized in solution, and approximately 2–4 weight percent, 2 weight percent in the preferred embodiment, of the anti-settling agent comprising the Bentone 38 in solution is utilized in the present composition. While preferred amounts are provided, it is to be understood that any amount of the anti-settling agent may be utilized if it effectively avoids settling of the flatting agent, prevents foaming of the composition upon application of the cloth and prevents complete penetration through the cloth when applied thereto.

The delustering composition of the present invention also includes an effective amount of an aromatic solvent to maintain the mixture in solution prior to application of the heat and to permit ready application of the composition to the carrier cloth. While any known aromatic solvent or combination of aromatic solvents may be utilized, it is preferred that the aromatic solvent in the present invention comprise xylene with an effective amount of butyl alcohol to prevent seepage of the delustering composition through the carrier cloth when it is applied to one side thereof. The butyl alcohol acts in conjunction with the anti-settling agent to prevent the seepage through the carrier cloth as described in greater detail below. The aromatic components are organic compounds used to control the viscosity and rheology and foaming tendency of the composition as it is applied to the carrier cloth. While the aromatic solvent is added to the composition in a manner described in greater detail below, and while any effective amount to achieve the above described functions may be utilized, it is preferred that approximately 15–25 weight percent, and preferably approximately 19 percent by weight, of the delustering composition comprises the aromatic solvent. Furthermore, to the xylene and butyl alcohol may be added an additional aromatic solvent of a somewhat higher molecular weight which is available under the trade name SC 100 from Ashland Chemical Company.

The above delustering composition is applied to a carrier cloth upon which the plastisol film is formed. While numerous carrier cloths are well known to the art for performing the function as described herein, it is preferred that a natural viscose rayon carrier cloth be utilized. In the preferred embodiment, the rayon cloth has a warp thread count of 43/cm, plus or minus 0.2 cm, and a fill thread count of 26/cm, plus or minus 0.2 cm, with a plain weave having a 1:1 ratio. In addition, the carrier cloth preferably includes 133 plus or minus 5 yarns/inch. The carrier cloth constructed as described above or similar thereto provide interstices sufficiently large to permit penetration of the delustering agent, yet the carrier is not so lightweight so as to allow complete coating penetration of the carrier cloth without filling the interstices between the yarns. Furthermore, it will aid in preventing complete penetration to the opposite side of the carrier cloth, which situation is not desirable as described in greater detail below.

To treat the carrier cloth with the above described delustering composition agent, the carrier cloth is unrolled and first desized. The sizing normally present in the rayon cloth must be removed inasmuch as the sizing of the material will interfere with complete coating of the cloth by the delustering agent. In preferred form, the cloth is desized by first scouring the cloth to remove the sizing. The cloth is sufficiently scoured so that the pH of the cloth after scouring will be approximately 6.0–7.5, thereby insuring that any residual alkali has been removed. The scoured cloth is then dried and heat set at a temperature of approximately 200° C. The heat setting is preferred so as to prevent shrinkage of the cloth as it is subsequently subjected to elevated temperatures of less than 200° C. The scoured cloth is then re-rolled and prepared for coating by the delustering agent.

To form the delustering agent as described above, a two step process is preferred. First, a mixture of the appropriate amounts of the silicone polyester resin, the fluorotelemer dispersed in a solvent, the inert flatting agent, the anti-settling agent and an aromatic solvent, preferably xylene, is prepared. This mixture is then blended throughly to disperse the particulate solids therein and to reduce the size of the solid agglomerates to a size of no greater than about 25 microns and preferably approximately 20 microns. Once this mixture is blended, the appropriate amounts of the curing agent, the catalyst solution and additional xylene and aromatic solvents are added and admixed therewith.

Once the above described delustering agent is prepared, the scoured carrier cloth is unwound and the surfaces thereof coated with the delustering agent to fill the interstices therein. The carrier cloth is then dried at an elevated temperature, preferably approximately 175°–180° C., to react the curing agent with the silicone polyester resin to cure the resin. In one form of the invention, one side of the carrier cloth is first coated throughly with the delustering agent, and the cloth is then subjected to a temperature of approximately 175°–180° C. for about 2–4 minutes. This reacts and cures the silicone resin on the one side of the cloth. The cloth is then turned over, and the second surface thereof is coated with the delustering agent and then subsequently dried at approximately 175°–180° C. for approximately 2–4 minutes to cure the resin applied on the second side. When this system of treating the carrier cloth is utilized, it is important that the first coating of the delustering agent not penetrate entirely through the carrier cloth. If such a situation should occur, the application of the second coat to the second side of the carrier cloth will not be totally effective inasmuch as the delustering agent will not adhere to the delustering agent which has soaked through the cloth and has already been cured on the second side. Therefore, in order to insure complete coating on both sides of the carrier cloth, it is important that complete penetration of the first coat of delustering agent be avoided.

In an alternate embodiment of the present invention, the scoured and dried carrier cloth may be directed through a vat containing a delustering agent so as to coat both sides of the cloth simultaneously and saturate the cloth. After such saturation, the cloth is then heat dried at approximately 175°–180° C. for approximately 2–4 minutes to cure the resin in the cloth. In this manner, the problems inherent with coating each side of the cloth individually as described above can be avoided entirely.

The present invention is also directed toward a novel process for manufacturing plastisol film having a delustered surface and useful in the production of camouflage materials. This process includes the desizing of a carrier cloth as described above, and a treatment of the carrier cloth with the delustering agent of the present invention as also described above. Once the carrier cloth has been treated so as to contain the cured delustering agent therein, a film-forming plastisol agent well known to the art is applied to one surface of the coated carrier cloth. This coated carrier cloth is then cured by heating the plastisol agent on the cloth to approximately 175°–180° C. for about 1–4 minutes. This causes the plastisol agent to plasticize and form a hard plastisol film on the cloth. The plastisol film is then separated from the cloth, preferably by physically pulling apart the two layers. The plastisol film readily releases from the carrier cloth due to the presence of the fluorotelemer in the delustering agent at the interface between the carrier cloth and the plastisol film, and the carrier cloth is then rewound and capable of being reused numerous times without further coating or treatment.

In prior art treatment of carrier cloths and production of plastisol films, the releasing agent was applied to the carrier cloth as a topmost coat. In the present invention, the fluorotelemer functions as the releasing agent for the plastisol from the carrier cloth and is not applied as a separate layer to the carrier cloth. Rather, the fluorotelemer, as described above, is intimately admixed with the silicone polyester resin and the remainder of the delustering agent. A detailed examination of the surfaces of carrier cloths treated with the delustering agent of the present invention as well as the release surface of the plastisol film formed on such a carrier cloth with a scanning electron microscope has been performed. While the results of such examinations are not conclusive, it is believed that several conclusions can be reached from such tests. First, as described in greater detail below, use of the delustering agent according to the present invention enables repeated use of such a treated carrier cloth in excess of a hundred uses. Therefore, it is clear that the fluorotelemer releasing agent in the delustering agent is present at the surface of the carrier cloth. It appears, therefore, that the fluorotelemer in some manner migrates during the curing of the polyester resin to the surface of the cloth.

It is also apparent from this that the fluorotelemer is in some manner bound at the surface of the carrier cloth after difusion therethrough, although chemical reaction between the fluorotelemer and the silicone polyester resin system does not appear likely. It is believed that the fluorotelemer is bound at the surface inasmuch as the electron microscope results indicate that after several uses of a carrier cloth, minute particles of plastisol are retained at the surface of the cloth. However, it does not appear that additional plastisol is retained at the surface of the carrier cloth as the carrier cloth is continued to be reused. Thus, this would indicate that apparently while less than one hundred percent of the surface of the carrier cloth becomes coated with fluorotelemer, the fluorotelemer which apparently migrates to the surface is retained at the surface throughout repeated uses of the cloth and is not pulled from the surface as is true of some prior art systems.

The electron microscope results also indicate that the dull, matte surface formed on the release surface of the plastisol is obtained primarily by transferring the overall weave pattern of the carrier cloth to the plastisol film, whereas the dull surface of the plastisol in prior art systems is achieved by using a higher degree of roughness in the plastisol itself. It is unknown why, through the use of the delustering agent of the present invention, the weave pattern of the carrier cloth is more readily transferred to the plastisol, although such a mechanism is highly desirable inasmuch as a smoother plastisol surface having, nonetheless, sufficient dullness results. Such a dull smooth surface permits easier removal of the plastisol film from the carrier cloth.

In accordance with the invention, a preferred delustering agent was prepared in the following manner. It will be understood that while specific compositions and amounts are given herein, the present invention is not to be limited thereby but rather is to be afforded the scope as previously described. A mixture having the following components was first prepared:

|  | Lbs. | Gals. | % By Weight |
| --- | --- | --- | --- |
| Aroplaz 1710 silicone polyester | 1038.2 | 116 | 50.38 |
| Vydax AR fluorotelemer | 82 | 5.99 | 3.98 |
| Syloid 244 silica | 212 | 12.72 | 10.29 |
| *Anti-settling agent | 48 | 7.16 | 2.33 |
| Xylene | 174 | 24 | 8.44 |
| *Anti-settling agent: |  |  |  |
| Aliphatic Petroleum Naphthas | 610.313 | 93.75 |  |
| Bentone 38 thixotrop | 70.0 | 4.9435 |  |
| Ketone | 29.325 | 3.75 |  |

The above mixture was dispersed on a Hockemeyer to 6–6½ grind (Hegman guage). The mixture was then blended in the Hockemeyer until the solids of the first mixture reached a size of approximately 20 microns. To this mixture was then added the following components:

|  | Lbs. | Gals. | % By Weight |
| --- | --- | --- | --- |
| Melamine | 190 | 20 | 9.22 |
| SC 100 aromatic solvent | 145 | 20 | 7.04 |
| **Catalyst Solution | 98.9 | 12 | 4.80 |
| Xylene | 72.5 | 10 | 3.52 |
| **Catalyst Solution: |  |  |  |
| Cyclamic acid | 10 | 0.88 |  |
| Ethylene glycol methyl ether solvent | 90 | 11.25 |  |

The above components were admixed with the first mixture until a throughly dispersed solution was formed. This delustering agent solution was then spread on a surface of a scoured carrier cloth as described herein above.

As can be seen from the above, the delustering agent of the present invention is easily applied to a woven rayon carrier cloth without requiring many steps and without requiring special attention to insuring proper combinations of carrier cloth and plastisol material. In addition, careful pretesting and other procedures required by prior art carrier coating compositions are obviated through use of the present invention. Furthermore, use of the disclosed delustering agent on a carrier cloth in the production of plastisol films for camouflage purposes in accordance with the invention permits ready release of the plastisol film from the treated carrier cloth and extensive reuse of such treated carrier cloths. Tests of carrier cloths treated with a composition described above yielded carrier cloths that were reusable from 46 to 142 times. The average reuse of such carrier cloths has been 110 times. Therefore, the present invention provides an economical composition to apply to a carrier cloth and enables economic production of camouflage plastisol films due to the extensive reuse of the carrier cloths. Furthermore, due to the nature of the manner by which the delustering agent of the invention cures on the carrier cloth, the releasing agent on the carrier cloth is not removed through extensive reuse, and the amount of plastisol adhering thereto is negligible. Finally, the delustering composition of the present invention and the use thereof and production of camouflage plastisol films results in delustered plastisol surfaces which meet required specifications yet retain a relatively smooth surface character. The present invention, therefore, provides a simple and economical manner of treating carrier cloths for the production of camouflage plastisol films as well as provides significant cost reductions in the production of camouflage plastisol films while producing films meeting required surface finish standards.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A composition for application to a carrier cloth to enable ready release of a plastisol film formed on said cloth and for delustering the release surface of said film, said composition comprising a mixture of:

a silicone polyester resin;

an effective amount of a fluorotelemer for delustering said release surface and permitting ready release of said film from said cloth;

a curing agent for curing said resin upon application of an effective amount of heat to said composition;

an effective amount of a catalyst solution to initiate reaction between said resin and said curing agent upon application of said heat;

an effective amount of an inert flatting agent for reducing the gloss of said plastisol release surface;

an effective amount of an anti-settling agent comprising a thixotrop in solution to prevent settling of said flatting agent prior to curing of said resin and to prevent foaming of said composition when applied to said carrier cloth; and an effective amount of an aromatic solvent to maintain said mixture in solution prior to application of said heat and to permit ready application of said composition to said cloth.

2. The composition as described in claim 1, wherein said fluorotelemer comprises a telemer of the group consisting of tetrafluoroethylene and polytetrafluoroethylene.

3. The composition as described in claim 2, wherein said fluorotelemer is dispersed in a solvent selected from the group consisting of trichlorotrifluoroethane, trichloroethane, methylene chloride, a 50/50 mixture of trichlorotrifluoroethane and toluene, a 50/50 mixture of trichlorotrifluoroethane and n-heptane, perchloroethylene, trichloroethylene, toluene, benzene and naphtha.

4. The composition as described in claim 1, wherein said fluorotelemer comprises approximately 20 weight percent of tetrafluoroethylene dispersed in trichlorotrifluoroethane.

5. The composition as described in claim 1, wherein said curing agent is selected from the group consisting of methylated melamine, butylated melamine, methylated urea formaldehyde resins and butylated urea formaldehyde resins.

6. The composition as described in claim 5, wherein said curing agent comprises methyl melamine solution.

7. The composition as described in claim 1, wherein said catalyst solution comprises an organic acid in solution.

8. The composition as described in claim 7, wherein said organic acid solution comprises an approximately 10% by weight cyclamic acid solution.

9. The composition as described in claim 1, wherein said inert flatting agent comprises silicon dioxide.

10. The composition as described in claim 1, wherein said anti-settling agent comprises a thixotropic clay in solution.

11. The composition as described in claim 1, wherein said aromatic solvent comprises xylene and an effective amount of butyl alchohol to prevent seepage of said composition through said carrier cloth when applied to one side thereof.

12. The composition as described in claim 1, wherein said mixture comprises 25–60 weight percent of said silicone polyester resin, 1–20 weight percent fluorotelemer, 1–18 weight percent of said curing agent, 2–7 weight percent of said catalyst solution, 7–15 weight percent of said flatting agent, and 2–4 weight percent of said anti-settling agent, the balance of said mixture being said aromatic solvent.

13. A plastisol delustering agent comprising a mixture of:

about 25–60% by weight of a silicone polyester resin;

about 1–20% by weight of a fluorotelemer dispersed in a solvent;

an effective amount of a methylated or butylated curing agent for reacting with and curing said resin upon application of an effective amount of heat;

an effective amount of an organic acid catalyst solution to initiate reaction between said resin and said curing agent upon application of said heat;

an effective amount of an inert flatting agent for reducing the gloss of said plastisol;

an effective amount of an anti-settling agent comprising a thixotrop in solution to prevent settling of said flatting agent prior to curing of said resin and to prevent foaming of said composition when applied; and an effective amount of an aromatic solvent to maintain said mixture in solution prior to application of said heat and to permit ready application of said composition to a surface means.

14. The delustering agent as described in claim 13, wherein said fluorotelemer comprises a telemer of the group consisting of tetrafluoroethylene and polytetrafluorothylene.

15. The delustering agent as described in claim 13, wherein said curing agent is selected from the group consisting of melamine and urea formaldehyde resin.

16. The delustering agent as described in claim 13, wherein said organic acid catalyst solution comprises an approximately 10% by weight cyclamic acid solution.

17. The delustering agent as described in claim 13, wherein said inert flatting agent comprises silicon dioxide, and said anti-settling agent comprises a thixotropic clay in solution.

18. The delustering agent as described in claim 13, wherein said aromatic solvent comprises xylene and an effective amount of butyl alchohol to prevent seepage of said delustering agent entirely through a carrier cloth when applied to one side thereof.

19. The delustering agent as described in claim 13, wherein said curing agent is present in said delustering agent in an amount of 5-30% by weight of said resin, and wherein said delustering agent includes approximately 2-7 weight percent of said catalyst solution, approximately 7-15 weight percent of said flatting agent, and approximately 2-4 weight percent of said anti-settling agent, the balance of said delustering agent being said aromatic solvent.

* * * * *